US010455638B2

(12) United States Patent
Karakkad Kesavan Namboodiri et al.

(10) Patent No.: US 10,455,638 B2
(45) Date of Patent: Oct. 22, 2019

(54) TECHNIQUES AND APPARATUSES FOR CONFIGURING AN EXTENDED DISCONTINUOUS RECEPTION CYCLE

(71) Applicant: QUALCOMM Incorporated, San Diego, CA (US)

(72) Inventors: Vishnu Namboodiri Karakkad Kesavan Namboodiri, Hyderabad (IN); Chinmaya Padhy, Koraput (IN); Mukesh Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 15/643,043

(22) Filed: Jul. 6, 2017

(65) Prior Publication Data

US 2019/0014603 A1 Jan. 10, 2019

(51) Int. Cl.
*H04W 4/00* (2018.01)
*H04W 76/28* (2018.01)
(Continued)

(52) U.S. Cl.
CPC ....... *H04W 76/28* (2018.02); *H04W 52/0216* (2013.01); *H04W 60/04* (2013.01); *H04W 84/045* (2013.01)

(58) Field of Classification Search
CPC . H04W 76/28; H04W 60/04; H04W 52/0216; H04W 84/045
See application file for complete search history.

(56) References Cited

U.S. PATENT DOCUMENTS

| 8,583,101 | B1* | 11/2013 | Xu | H04W 52/0216 |
|---|---|---|---|---|
| | | | | 455/422.1 |
| 2008/0181127 | A1* | 7/2008 | Terry | H04W 52/0212 |
| | | | | 370/252 |

(Continued)

FOREIGN PATENT DOCUMENTS

| EP | 3282732 A1 | 2/2018 |
|---|---|---|
| WO | 2016163723 A1 | 10/2016 |
| WO | WO-2017065671 A1 | 4/2017 |

OTHER PUBLICATIONS

C. Chang and J. Chen, "Adjustable Extended Discontinuous Reception Cycle for Idle-State Users in LTE-A," Nov. 2016, IEEE Communications Letters, vol. 20, No. 11, pp. 2288-2291, http://ieeexplore.ieee.org/stamp/stamp.jsp?tp=&arnumber=7549050&isnumber=7740115.*

(Continued)

*Primary Examiner* — Maharishi V Khirodhar
*Assistant Examiner* — Kenneth P Hunt
(74) *Attorney, Agent, or Firm* — Harrity & Harrity, LLP

(57) ABSTRACT

Certain aspects of the present disclosure generally relate to wireless communication. In some aspects, a user equipment (UE) may configure a cycle length of an extended discontinuous reception (eDRX) cycle, and may determine whether the UE is in a condition, associated with triggering a tracking area update, during an on duration of the eDRX cycle. The UE may selectively increase or decrease the cycle length of the eDRX cycle based at least in part on determining whether the UE is in the condition. The cycle length may be decreased when the UE is in the condition or may be increased when the UE is not in the condition. Numerous other aspects are provided.

32 Claims, 9 Drawing Sheets

(51) Int. Cl.
*H04W 52/02* (2009.01)
*H04W 60/04* (2009.01)
*H04W 84/04* (2009.01)

(56) References Cited

U.S. PATENT DOCUMENTS

| | | | | |
|---|---|---|---|---|
| 2010/0113023 | A1* | 5/2010 | Huang | H04W 52/0216 |
| | | | | 455/436 |
| 2010/0124934 | A1* | 5/2010 | Mach | H04W 24/02 |
| | | | | 455/456.1 |
| 2010/0137013 | A1* | 6/2010 | Ren | H04W 52/0216 |
| | | | | 455/500 |
| 2010/0323683 | A1* | 12/2010 | Kazmi | H04W 64/00 |
| | | | | 455/422.1 |
| 2011/0026484 | A1* | 2/2011 | Fox | H04W 60/00 |
| | | | | 370/331 |
| 2011/0130141 | A1* | 6/2011 | Frost | H04W 60/02 |
| | | | | 455/436 |
| 2012/0189016 | A1* | 7/2012 | Bakker | H04W 76/11 |
| | | | | 370/401 |
| 2013/0301501 | A1 | 11/2013 | Olvera-Hernandez et al. | |
| 2014/0161007 | A1* | 6/2014 | Donthi | H04W 52/0216 |
| | | | | 370/311 |
| 2014/0321343 | A1* | 10/2014 | Gupta | H04W 4/70 |
| | | | | 370/311 |
| 2016/0205622 | A1* | 7/2016 | Ronneke | H04W 52/0203 |
| | | | | 370/311 |
| 2016/0295504 | A1 | 10/2016 | Wang et al. | |
| 2016/0295636 | A1 | 10/2016 | Yang et al. | |
| 2017/0026861 | A1 | 1/2017 | Tseng et al. | |
| 2017/0048772 | A1* | 2/2017 | Gheorghiu | H04W 36/14 |
| 2017/0318536 | A1* | 11/2017 | Manepalli | H04W 52/0245 |

OTHER PUBLICATIONS

B. Barton, "Tracking Area Update (TAU) procedure," Apr. 29 2012, LTE and Beyond, http://www.lteandbeyond.com/2012/04/tracking-area-update-tau-procedure.html.*
Chang C-W., et al., "Adjustable Extended Discontinuous Reception Cycle for Idle-State Users in LTE-A", IEEE Communications Letters, vol. 20, No. 11, Nov. 2016, pp. 2288-2291.
International Search Report and Written Opinion—PCT/US2018/040399—ISA/EPO—dated Oct. 10, 2018.

* cited by examiner

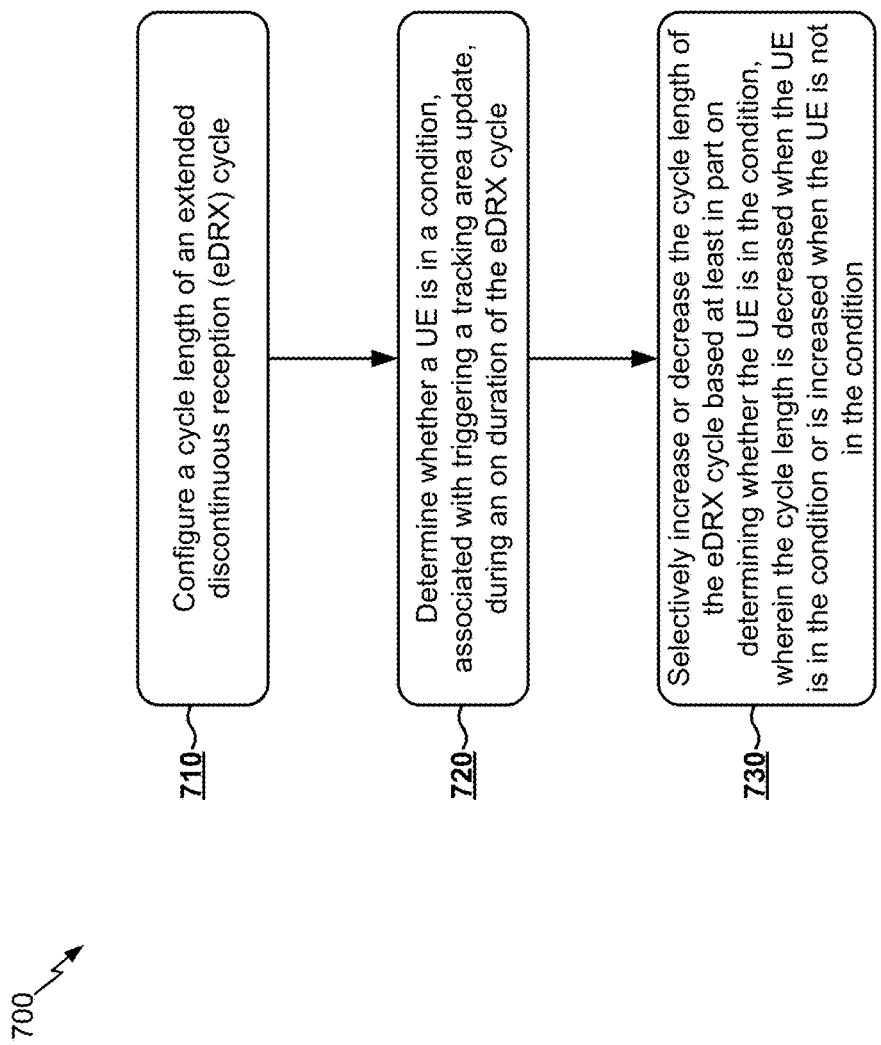

TECHNIQUES AND APPARATUSES FOR CONFIGURING AN EXTENDED DISCONTINUOUS RECEPTION CYCLE

FIELD OF THE DISCLOSURE

Aspects of the present disclosure generally relate to wireless communication, and more particularly to techniques and apparatuses for configuring an extended discontinuous reception cycle to account for tracking area update conditions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, an eNB, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication may be performed by a user equipment (UE). The method may include configuring a cycle length of an extended discontinuous reception (eDRX) cycle; determining whether the UE is in a condition, associated with triggering a tracking area update, during an on duration of the eDRX cycle; and selectively increasing or decreasing the cycle length of the eDRX cycle based at least in part on determining whether the UE is in the condition, wherein the cycle length is decreased when the UE is in the condition or is increased when the UE is not in the condition.

In some aspects, another method for wireless communication may be performed by a UE. The method may include waking up for a plurality of on durations of an eDRX cycle, wherein the eDRX cycle is configured with a cycle length; periodically determining whether the UE is in a condition, associated with triggering a tracking area update, during the plurality of on durations; and periodically reconfiguring the cycle length of the eDRX cycle based at least in part on determining whether the UE is in the condition, wherein the cycle length is decreased when the UE is in the condition or is increased when the UE is not in the condition.

In some aspects, a UE for wireless communication may include a memory and one or more processors operatively coupled to the memory. The one or more processors may be configured to configure a cycle length of an eDRX cycle; determine whether the UE is in a condition, associated with triggering a tracking area update, during an on duration of the eDRX cycle; and selectively increase or decrease the cycle length of the eDRX cycle based at least in part on determining whether the UE is in the condition, wherein the cycle length is decreased when the UE is in the condition or is increased when the UE is not in the condition.

In some aspects, another UE for wireless communication may include a memory and one or more processors operatively coupled to the memory. The one or more processors may be configured to wake up for a plurality of on durations of an eDRX cycle, wherein the eDRX cycle is configured with a cycle length; periodically determine whether the UE is in a condition, associated with triggering a tracking area update, during the plurality of on durations; and periodically reconfigure the cycle length of the eDRX cycle based at least in part on determining whether the UE is in the condition, wherein the cycle length is decreased when the UE is in the condition or is increased when the UE is not in the condition.

In some aspects, a non-transitory computer-readable medium may store one or more instructions for wireless communication. The one or more instructions, when executed by one or more processors, may cause the one or more processors to configure a cycle length of an eDRX cycle; determine whether a UE is in a condition, associated with triggering a tracking area update, during an on duration of the eDRX cycle; and selectively increase or decrease the cycle length of the eDRX cycle based at least in part on determining whether the UE is in the condition, wherein the cycle length is decreased when the UE is in the condition or is increased when the UE is not in the condition.

In some aspects, another non-transitory computer-readable medium may store one or more instructions for wireless communication. The one or more instructions, when executed by one or more processors, may cause the one or more processors to wake up for a plurality of on durations of an eDRX cycle, wherein the eDRX cycle is configured with a cycle length; periodically determine whether the UE is in a condition, associated with triggering a tracking area update, during the plurality of on durations; and periodically reconfigure the cycle length of the eDRX cycle based at least in part on determining whether the UE is in the condition, wherein the cycle length is decreased when the UE is in the condition or is increased when the UE is not in the condition.

In some aspects, an apparatus for wireless communication may include means for configuring a cycle length of an eDRX cycle; means for determining whether the apparatus is in a condition, associated with triggering a tracking area update, during an on duration of the eDRX cycle; and means for selectively increasing or decreasing the cycle length of the eDRX cycle based at least in part on determining whether the apparatus is in the condition, wherein the cycle length is decreased when the apparatus is in the condition or is increased when the apparatus is not in the condition.

In some aspects, another apparatus for wireless communication may include means for waking up for a plurality of on durations of an eDRX cycle, wherein the eDRX cycle is configured with a cycle length; means for periodically determining whether the apparatus is in a condition, associated with triggering a tracking area update, during the plurality of on durations; and means for periodically reconfiguring the cycle length of the eDRX cycle based at least in part on determining whether the apparatus is in the condition, wherein the cycle length is decreased when the apparatus is in the condition or is increased when the apparatus is not in the condition.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7 and 8 are diagrams illustrating example processes performed, for example, by a user equipment, in accordance with various aspects of the present disclosure.

DETAILED DESCRIPTION

Figure 1:
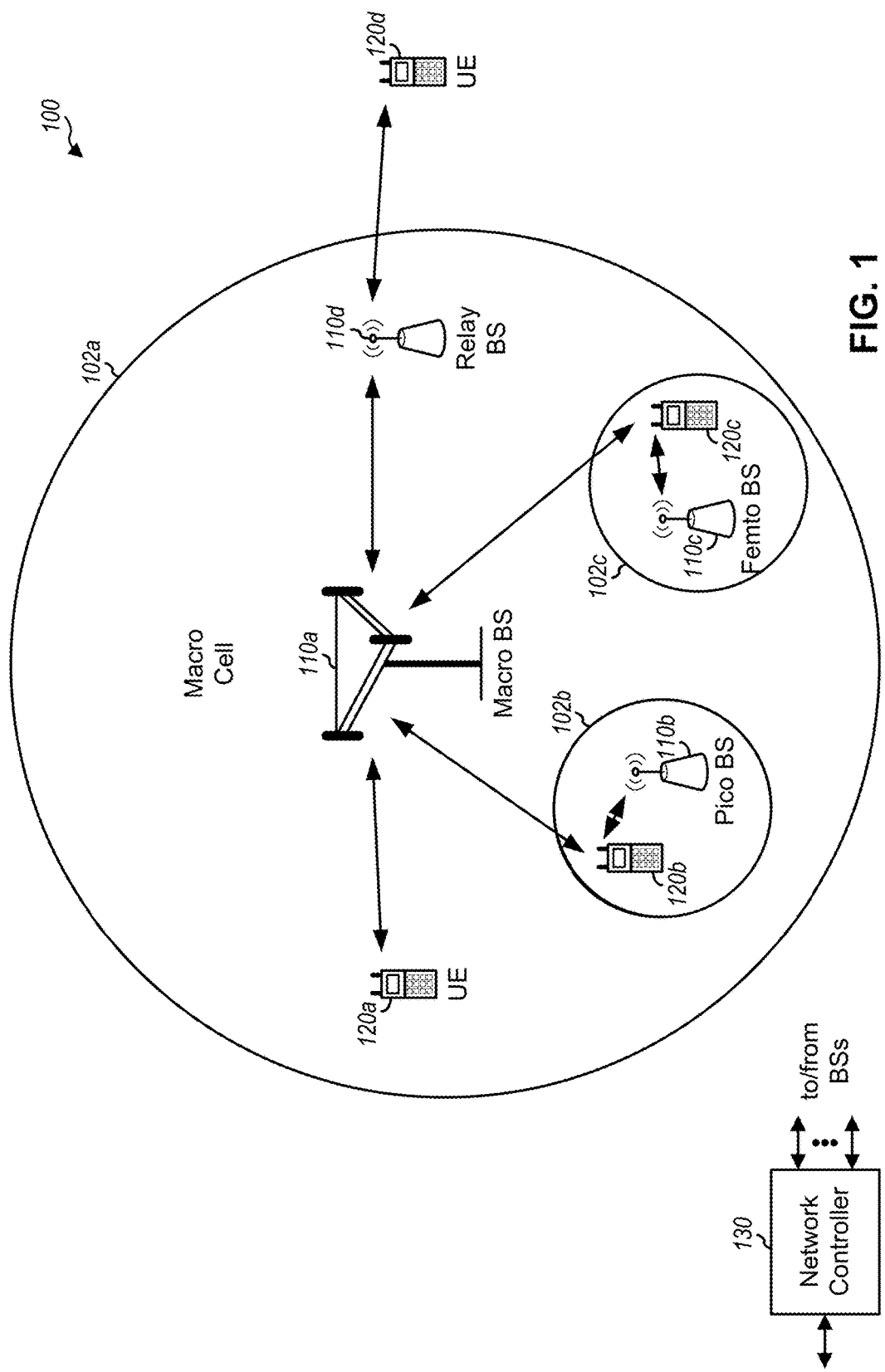
FIG. 1 is a block diagram conceptually illustrating an example of a wireless communication network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect. Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
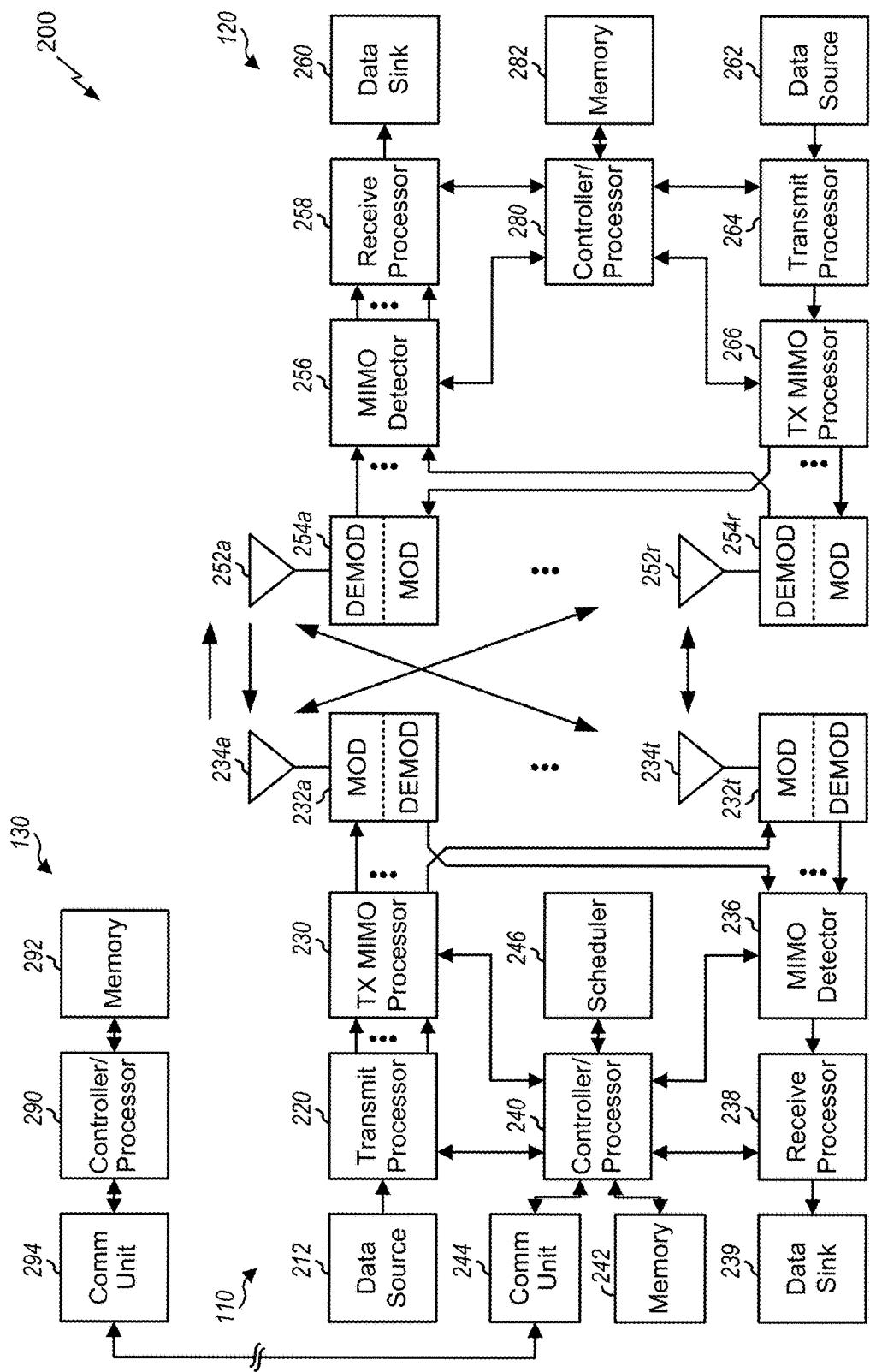
FIG. 2 shows a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to certain aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to configure an extended discontinuous reception cycle to account for tracking area update conditions. For example, controller/processor 280 and/or other processors and modules at UE 120, may perform or direct operations of UE 120 to configure an extended discontinuous reception cycle to account for tracking area update conditions. For example, controller/processor 280 and/or other controllers/processors and modules at UE 120 may perform or direct operations of, for example, process 700 of FIG. 7, process 800 of FIG. 8, and/or other processes as described herein. In some aspects, one or more of the components shown in FIG. 2 may be employed to perform example process 700, example process 800, and/or other processes for the techniques described herein. Memories 242 and 282 may store data and program codes for base station 110 and UE 120, respectively. A scheduler 246 may schedule UEs for data transmission on the downlink and/or uplink.

In some aspects, base station 110 and/or UE 120 may include means for configuring a cycle length of an eDRX cycle; means for determining whether the apparatus is in a condition, associated with triggering a tracking area update, during an on duration of the eDRX cycle; and means for selectively increasing or decreasing the cycle length of the eDRX cycle based at least in part on determining whether the apparatus is in the condition, wherein the cycle length is decreased when the apparatus is in the condition or is increased when the apparatus is not in the condition. Additionally, or alternatively, base station 110 and/or UE 120 may include means for waking up for a plurality of on durations of an eDRX cycle, wherein the eDRX cycle is configured with a cycle length; means for periodically determining whether the apparatus is in a condition, associated with triggering a tracking area update, during the plurality of on durations; and means for periodically reconfiguring the cycle length of the eDRX cycle based at least in part on determining whether the apparatus is in the condition, wherein the cycle length is decreased when the apparatus is in the condition or is increased when the apparatus is not in the condition. Additionally, or alternatively, base station 110 and/or UE 120 may include means for performing one or more other operations described herein. Such means may include one or more components shown in FIG. 2.

As indicated above, FIG. 2 is provided merely as an example. Other examples are possible and may differ from what was described with regard to FIG. 2.

Figure 3:
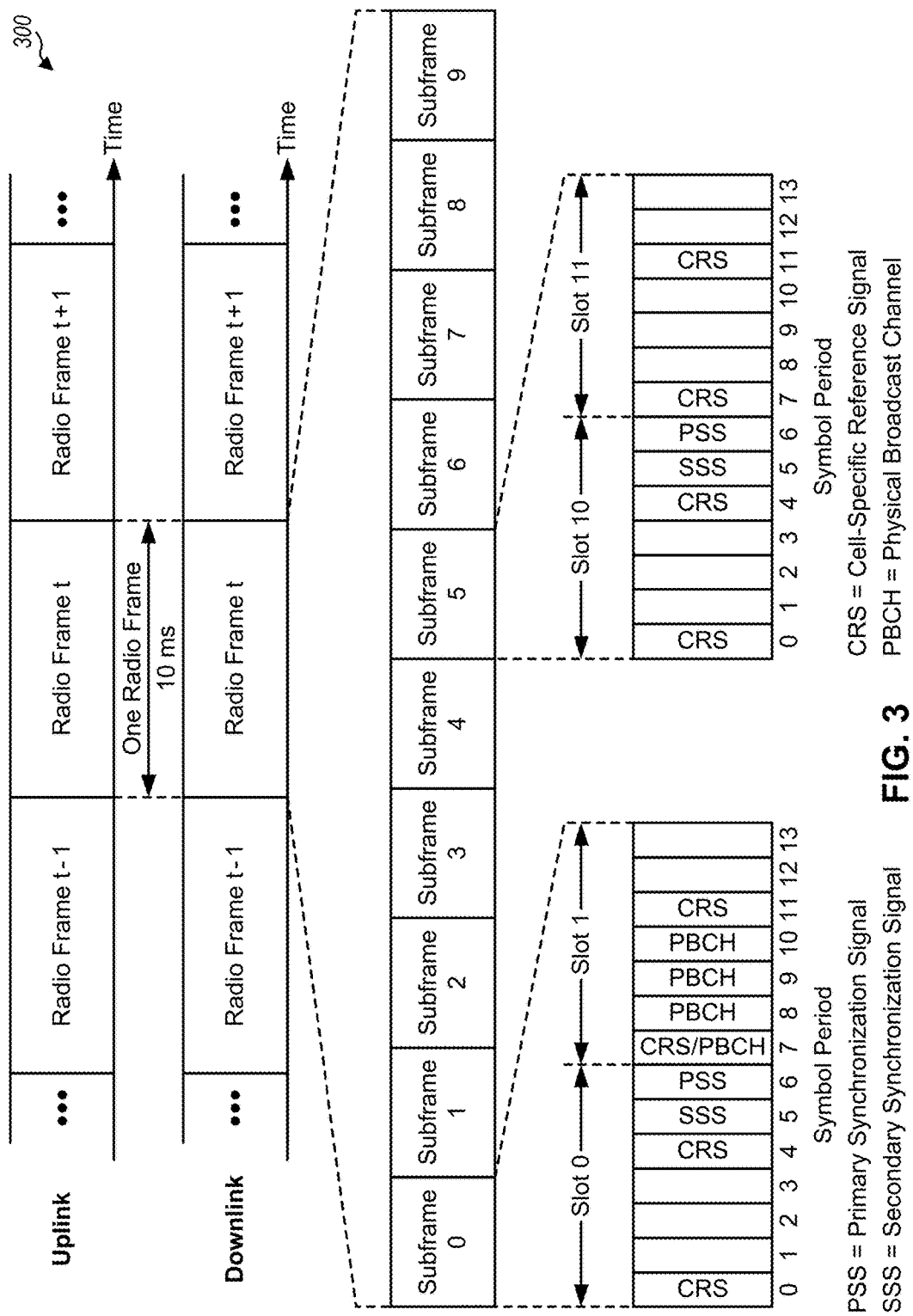
FIG. 3 is a block diagram conceptually illustrating an example of a frame structure in a wireless communication network, in accordance with certain aspects of the present disclosure.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
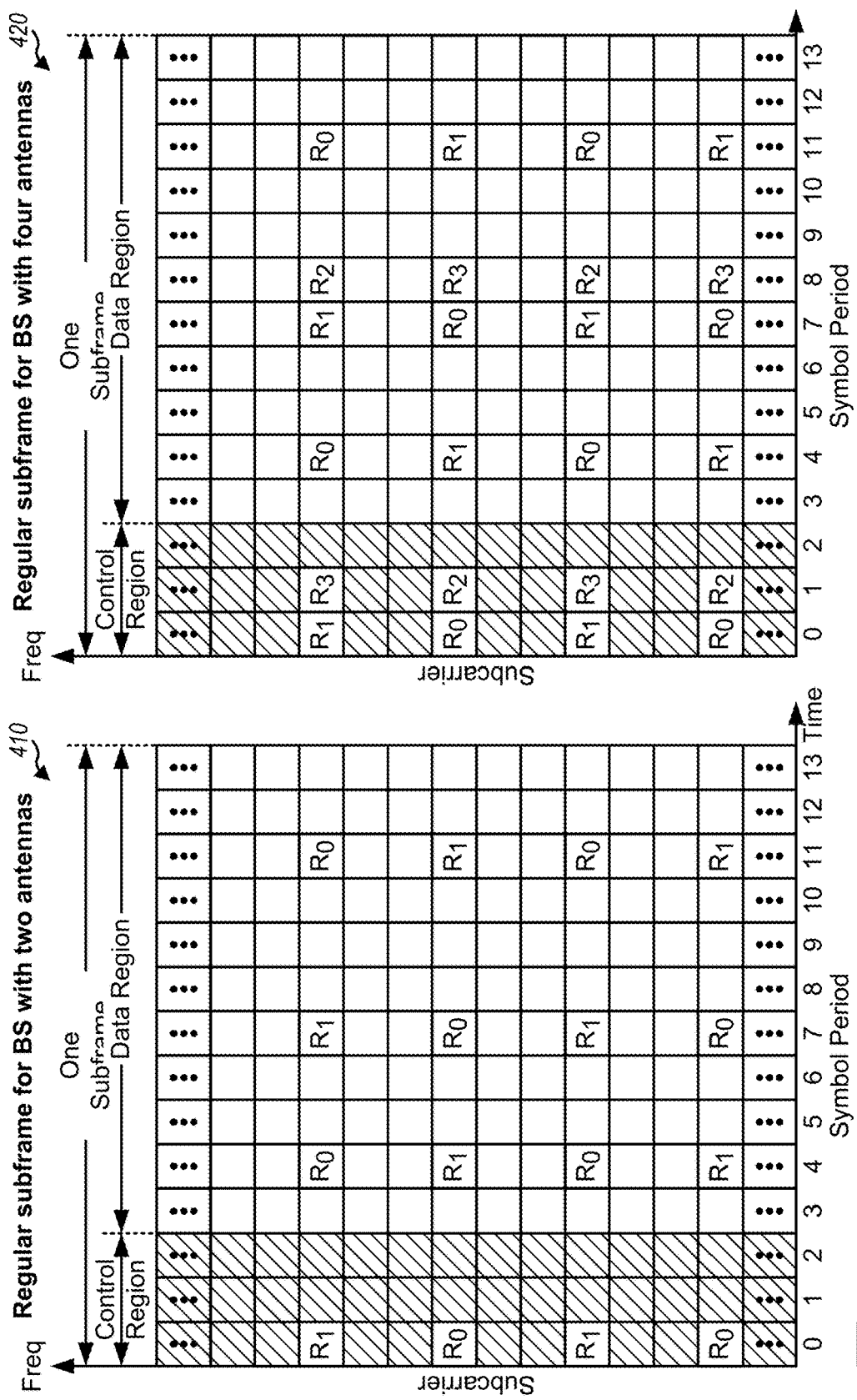
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q E {0, ..., Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
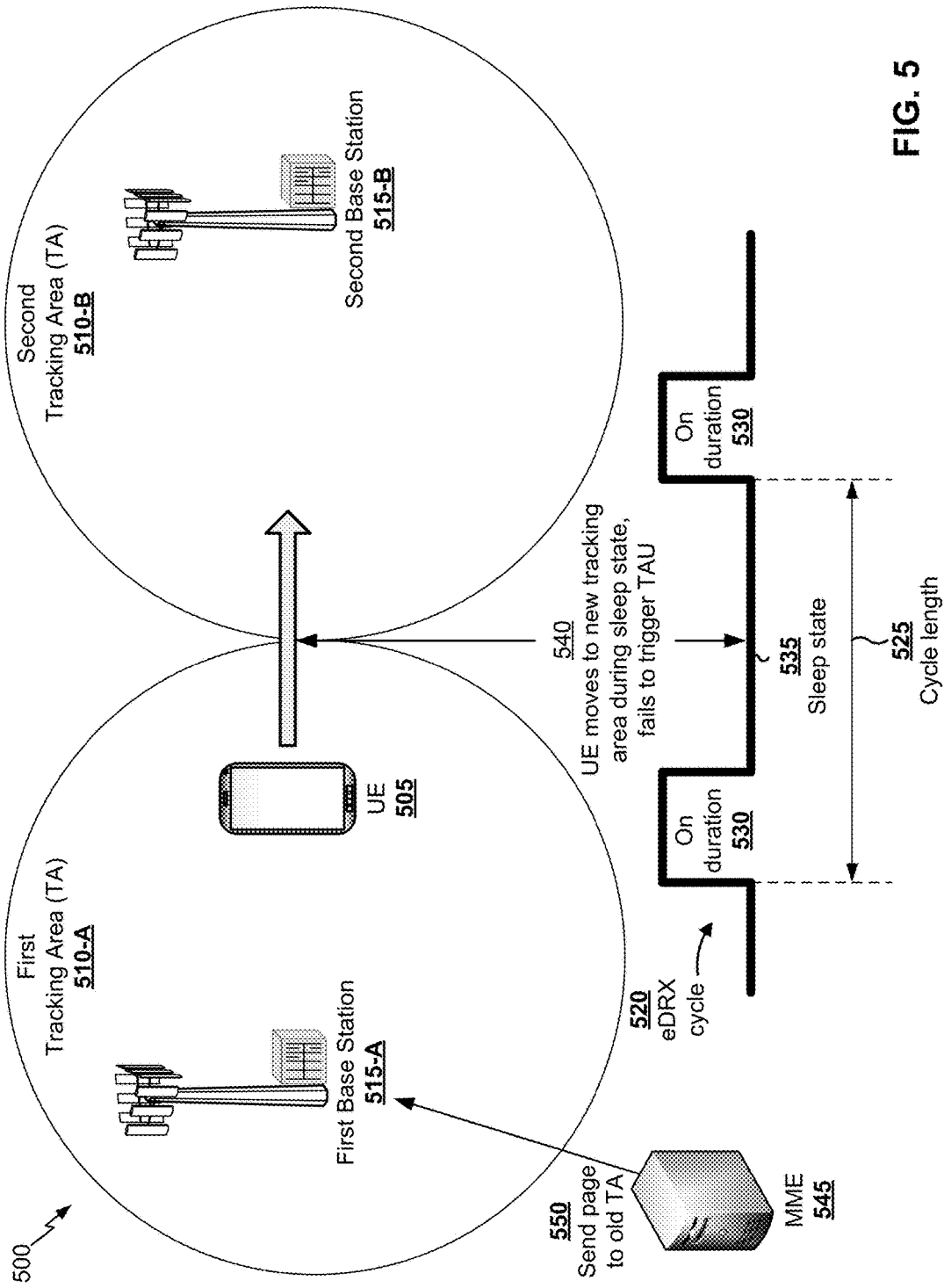
FIGS. 5, 6A, and 6B are diagrams illustrating examples associated with configuring an extended discontinuous reception cycle to account for tracking area update conditions.

FIG. 5 is a diagram illustrating an example 500 associated with configuring an extended discontinuous reception cycle to account for tracking area update conditions.

As shown in FIG. 5, a UE 505 may move from a first tracking area 510-A to a second tracking area 510-B. A first base station 515-A may serve the UE 505 in the first tracking area 510-A, and a second base station 515-B may serve the UE 505 in the second tracking area 510-B. In some aspects, UE 505 may correspond to one or more UEs described elsewhere herein, such as UE 120 of FIG. 1 and/or the like. In some aspects, one or more base stations 515-A, 515-B may correspond to one or more base stations described elsewhere herein, such as base station 110 of FIG. 1 and/or the like.

A tracking area may refer to a group of cells and/or an area served by a group of base stations from which the UE 505 can receive paging messages while in idle mode. The tracking area may be updated by a TAU procedure when the UE 505 crosses from the first tracking area 510-A to the second tracking area 510-B. When the UE 505 is in a connected mode, then the network may know the cell in which the UE 505 is located. However, when the UE 505 is in idle mode, the network may not know the cell of the UE 505, but know the tracking area, so the base stations in the tracking area of the UE 505 send paging messages in an attempt to page the UE 505. When the UE 505 leaves the tracking area, the UE 505 needs to notify the network of the new tracking area (e.g., a new group of base stations). In some cases, a tracking area may be referred to as a location area, a routing area, and/or the like.

In some aspects, the UE 505 may be configured with an extended discontinuous reception (eDRX) cycle 520. For example, the UE 505 may be configured with the eDRX cycle 520 when in an idle mode (e.g., as opposed to a connected mode discontinuous reception (CDRX) cycle which may be configured for the UE 505 when the UE 505 is in a connected mode). The eDRX cycle 520 may have a cycle length 525, which may include an eDRX on duration 530 followed by an eDRX sleep state 535, which may repeat for multiple cycles. The UE 505 may power on one or more UE components (e.g., a modem, a processor, and/or the like) during the on duration 530, and may power off one or more UE components during the sleep state 535 to conserve battery power.

In some aspects, the eDRX cycle 520 may have a relatively long sleep state 535 (e.g., off duration) as compared to a regular DRX cycle (e.g., an idle mode DRX cycle and/or a connected mode DRX (CDRX) cycle). The eDRX cycle may be triggered and/or used in certain circumstances, such as with a particular type, class, or category of UE 505 (e.g., an IoT UE, an NB-IOT UE, an MTC UE, an eMTC UE, and/or the like). As an example, a regular DRX cycle may have a sleep state of 1.28 seconds, whereas an eDRX sleep state 535 may be greater than 1.28 seconds and/or up to 10.24 seconds. Additionally, or alternatively, an eDRX sleep state 535 may be greater than or equal to 5.12 seconds, greater than or equal to 10.24 seconds, and/or the like. Additionally, or alternatively, an eDRX sleep state 535 may be within a range of 1.28 seconds to 10.24 seconds, greater than 10.24 seconds, on the order of minutes, hours, or days, and/or the like.

As shown by reference number 540, the UE 505 may move to a new tracking area during the sleep state 535. In this case, the UE 505 may fail to trigger a tracking area update (TAU) and/or may fail to receive a TAU message (e.g., because the UE is in the sleep state 535 when the TAU would normally be triggered and/or the TAU message would normally be received). As a result, a mobility management entity (MME) 545 may send a page, intended for the UE 505, to the first base station 515-A in the first tracking area 510-A, as shown by reference number 550. In this case, the UE 505 may fail to receive the page or may be delayed in receiving the page because the UE 505 moved from the first tracking area 510-A to the second tracking area 510-B, resulting in a poor user experience and wasted network resources.

Techniques described herein assist with adjusting the cycle length 525 of the eDRX cycle 520 based at least in part on whether the UE 505 is in a condition associated with triggering a TAU. For example, if the UE 505 is in a condition associated with triggering a TAU, then the UE 505 may decrease the cycle length 525 so that the UE 505 is more likely to trigger a TAU and/or receive a TAU message, thereby conserving network resources (e.g., by reducing wasted pages) and reducing messaging delays. Additionally, or alternatively, if the UE 505 is not in a condition associated with triggering a TAU, then the UE 505 may increase the cycle length 525 so that the UE 505 conserves battery power. Additional details are described below.

As indicated above, FIG. 5 is provided merely as an example. Other examples are possible and may differ from what was described with regard to FIG. 5.

Figure 6A:
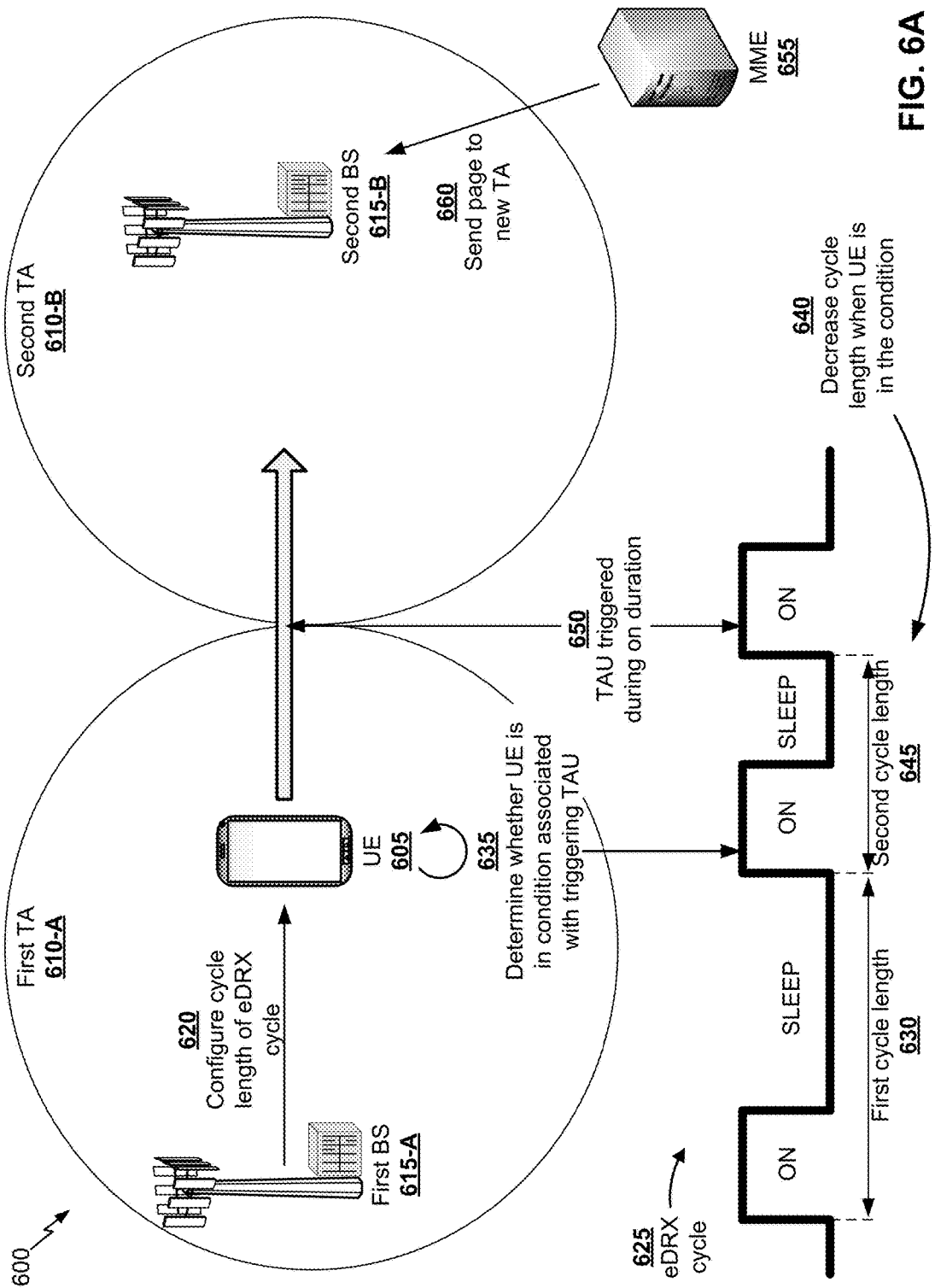
Figure 6B:
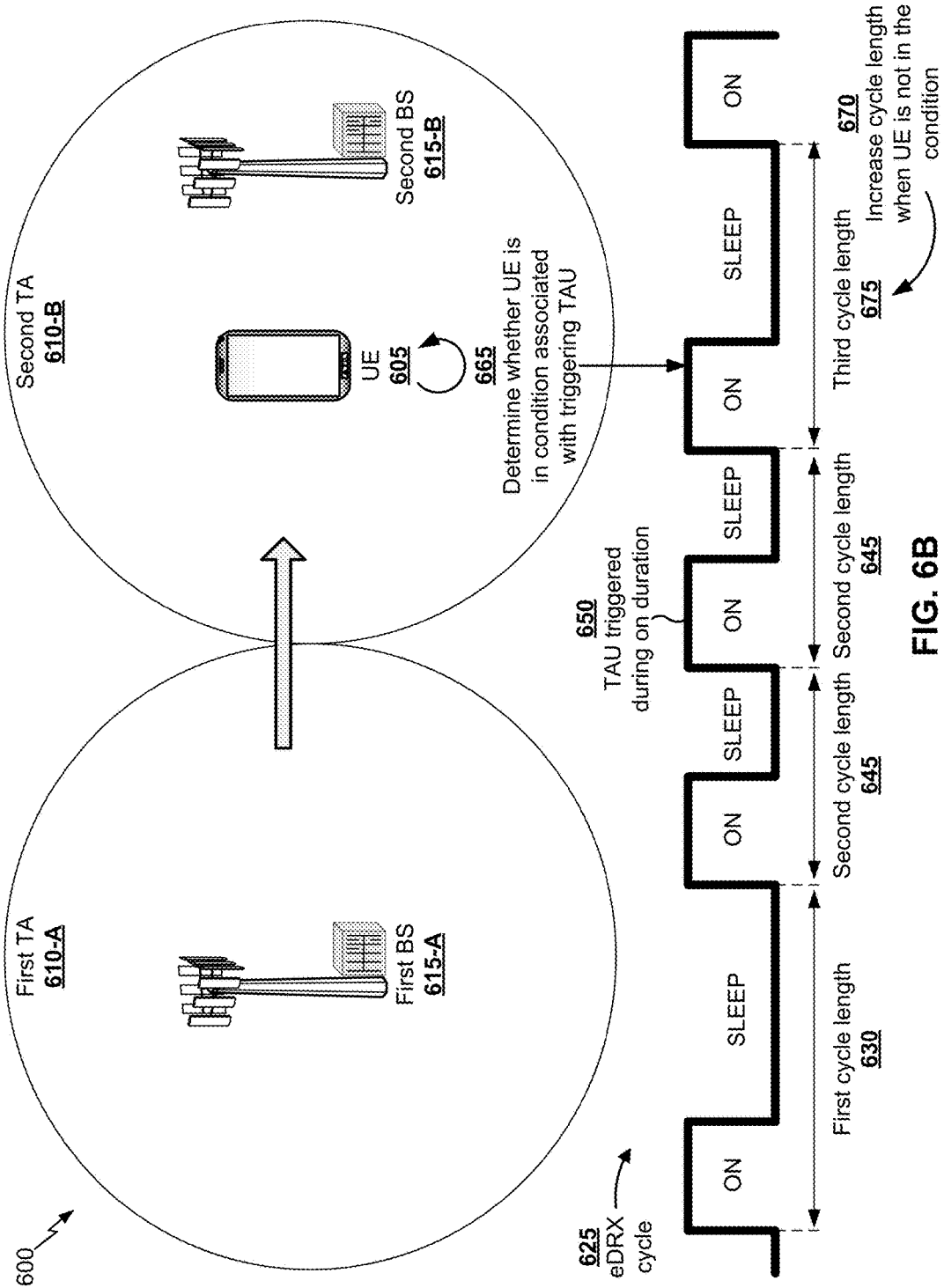

FIGS. 6A and 6B are diagrams illustrating examples 600 associated with configuring an extended discontinuous reception cycle to account for tracking area update conditions.

As shown in FIG. 6A, a UE 605 may move from a first tracking area 610-A to a second tracking area 610-B, in a similar manner as described above in connection with FIG. 5. A first base station 615-A may serve the UE 605 in the first tracking area 610-A, and a second base station 615-B may serve the UE 605 in the second tracking area 610-B, in a similar manner as described above in connection with FIG. 5. In some aspects, UE 605 may correspond to one or more UEs described elsewhere herein, such as UE 120 of FIG. 1, UE 505 of FIG. 5, and/or the like. In some aspects, one or more base stations 615-A, 615-B may correspond to one or more base stations described elsewhere herein, such as base station 110 of FIG. 1, base stations 515-A, 515-B of FIG. 5, and/or the like.

As shown by reference number 620, the UE 605 may be configured with a cycle length of an eDRX cycle 625. In some aspects, the UE 605 may communicate with the first base station 615-A to configure the cycle length of the eDRX cycle 625. For example, the first base station 615-A may indicate the cycle length to the UE 605, such as in a radio resource control (RRC) message (e.g., an RRC configuration message, an RRC reconfiguration message, and/or the like). Additionally, or alternatively, the UE 605 and the first base station 615-A may negotiate one or more parameters, and the UE 605 may be configured with the cycle length for the eDRX cycle 625 based at least in part on the negotiation. In some aspects, the cycle length may be an initial cycle length, and may be adjusted based at least in part on whether the UE 605 is in a condition associated with triggering a TAU, as described in more detail below.

In some aspects, the UE 605 may be initially configured with a minimum cycle length of the eDRX cycle 625 to increase the likelihood of triggering a TAU update. In some aspects, the UE 605 may be initially configured with a maximum cycle length of the eDRX cycle 625 to conserve battery power. In some aspects, the UE 605 may be initially configured with a cycle length of the eDRX cycle 625 that is between the minimum cycle length and the maximum cycle length to balance a likelihood of triggering a TAU update and a conservation of battery power. In some aspects, the minimum cycle length is based at least in part on a TAU period. In this way, an on duration of the eDRX cycle 625 may be aligned with the TAU period, which may increase the likelihood that the UE 605 triggers a TAU when necessary.

As further shown in FIG. 6A, the eDRX cycle 625 may be configured with a first cycle length 630 (e.g., the initial cycle length, a reconfigured cycle length, and/or the like), which may include an eDRX on duration (shown as "ON") and an eDRX sleep state (shown as "SLEEP"). The on duration and the sleep state may repeat for multiple cycles having the first cycle length 630, although only one cycle having the first cycle length 630 is shown for simplicity.

As shown by reference number 635, the UE 605 may determine whether the UE 605 is in a condition associated with triggering a TAU. As further shown, the UE 605 may make this determination during an on duration of the eDRX cycle 625. In some aspects, the condition may be a mobility condition that indicates, for example, that the UE 605 is moving quickly (e.g., at a speed that satisfies a threshold, with an acceleration that satisfies a threshold, and/or the like), is moving across tracking area and/or cell boundaries, and/or the like, and is thus likely to undergo a TAU procedure. Additionally, or alternatively, the condition may be a cell edge condition that indicates that the UE 605 is located near a tracking area and/or a cell boundary, and is thus likely to undergo a TAU procedure.

The UE 605 may selectively increase or decrease the cycle length of the eDRX cycle 625 based at least in part on determining whether the UE 605 is in the condition associated with triggering a TAU. For example, as shown by reference number 640, the UE 605 may decrease the cycle length when the UE 605 is in the condition associated with triggering a TAU. As shown, the cycle length of the eDRX cycle 625 may be decreased from the first cycle length 630 to the second cycle length 645. In some aspects, the cycle length may be decreased by decreasing a sleep state duration. In some aspects, the cycle length may be decreased by decreasing the on duration. In some aspects, the cycle length may be decreased by decreasing a sleep state duration and the on duration.

In some aspects, the condition may indicate whether a change in energy (e.g., a change in received symbol energy) detected by the UE 605 in a time period satisfies a threshold. In this case, the UE 605 may increase, decrease, or maintain the cycle length based at least in part on whether the change in energy detected by the UE 605 in a time period satisfies a threshold. For example, if a symbol energy measured by the UE 605 changes by a threshold amount (e.g., 5 dBm or more, 10 dBm or more, 15 dBm or more, etc.) within a time period (e.g., 5 ms, 10 ms, 15 ms, etc.), then this may indicate that a channel variation is high and/or that the UE 605 is likely to be moving between base stations, which may indicate that the UE 605 is in a condition associated with triggering a TAU. In some aspects, the UE 605 may compare the change in energy in a time period to one or more thresholds, and may increase, decrease, or maintain the cycle length based at least in part on which threshold(s) are satisfied.

In some aspects, the condition may indicate whether a number of tracking area changes for the UE 605 in a time period satisfies a threshold. In this case, the UE 605 may increase, decrease, or maintain the cycle length based at least in part on whether the number of tracking area changes for the UE 605 in a time period satisfies a threshold. For example, if the UE 605 undergoes a threshold amount (e.g., 2 or more, 3 or more, etc.) of tracking area changes within a time period (e.g., 5 seconds, 10 seconds, etc.), then this may indicate that a channel variation is high and/or that the UE 605 is moving between base stations, which may indicate that the UE 605 is in a condition associated with triggering a TAU. In some aspects, the UE 605 may compare the number of tracking area changes in a time period to one or more thresholds, and may increase, decrease, or maintain the cycle length based at least in part on which threshold(s) are satisfied.

In some aspects, the condition may indicate whether a received energy (e.g., a signal strength, a signal quality, SINR, RSRP, RSSI, RSRQ, CQI, and/or the like) of a serving cell (e.g., a cell of the first base station 615-A) of the UE 605 satisfies a threshold. In this case, the UE 605 may increase, decrease, or maintain the cycle length based at least in part on whether the received energy of the serving cell of the UE 605 satisfies a threshold. For example, if the received energy satisfies a threshold (e.g., is less than −23 dBm, is less than −20 dBm, etc.), then this may indicate that the UE 605 is near a cell edge, which may indicate that the UE 605 is in a condition associated with triggering a TAU. In some aspects, the UE 605 may compare received energy to one or more thresholds, and may increase, decrease, or maintain the cycle length based at least in part on which threshold(s) are satisfied.

In some aspects, the condition may be determined based at least in part on location information associated with the UE 605 (e.g., using GPS data, triangulation data, cell positioning data, and/or the like). In this case, the UE 605 may increase, decrease, or maintain the cycle length based at least in part on the location information. For example, the UE 605 may use the location information to determine whether the UE 605 is within a threshold distance of a cell edge. If the UE 605 is within a threshold distance of a cell edge, then this may indicate that the UE 605 is in a condition associated with triggering a TAU.

As shown by reference number 650, the UE 605 may decrease the cycle length for the UE 605 to perform a TAU procedure when the UE 605 is in the condition. For example, when the UE 605 decreases the cycle length of the eDRX cycle 625, the UE 605 is more likely to trigger a TAU. For example, the UE 605 may trigger a TAU procedure during an on duration of the eDRX cycle 625 (e.g., after the shortened second cycle length 645), as opposed to failing to trigger the TAU procedure when the UE 605 is in a sleep state during a time period when the TAU would be triggered (e.g., as described above in connection with FIG. 5). In this case, an MME 655 may send a page, intended for the UE 605, to the second base station 615-B in the second tracking area 610-A, as shown by reference number 660. In this way, the UE 605 may receive the page in a timely manner. Furthermore, this may conserve network resources (e.g., by reducing wasted pages) and/or reduce messaging delays. Furthermore, resources of the MME 655 may be conserved, such as memory resources associated with storing pages (e.g., when a UE 605 leaves a tracking area without performing a TAU), processing resources associated with determining a new tracking area for a UE 605 that leaves a tracking area without performing a TAU, and/or the like.

As shown in FIG. 6B, and by reference number 665, at a later time (e.g., after moving into the second tracking area 610-B and/or completing one or more eDRX cycles 625 with the shortened second cycle length 645), the UE 605 may again determine whether the UE 605 is in a condition associated with triggering a TAU. As further shown, the UE 605 may make this determination during an on duration of the eDRX cycle 625.

As shown by reference number 670, the UE 605 may increase the cycle length when the UE 605 is not in the condition associated with triggering a TAU. As shown, the cycle length of the eDRX cycle 625 may be increased from the second cycle length 645 to a third cycle length 675. In some aspects, the cycle length may be increased by increasing a sleep state duration. Additionally, or alternatively, the cycle length may be increased by increasing the on duration. By increasing the cycle length of the eDRX cycle 625 when the UE 605 is not in the condition associated with triggering the TAU, the UE 605 may conserve battery power with a reduced risk of missing a TAU.

In some aspects, the third cycle length 675 may be equal in length to the first cycle length 630, and different in length from the second cycle length 645. For example, the UE 605 may switch between two cycle lengths for the eDRX cycle 625.

In some aspects, the third cycle length 675 is different from both the first cycle length 630 and the second cycle length 645. For example, the UE 605 may switch among three or more cycle lengths for the eDRX cycle 625. In some aspects, the UE 605 may switch among three, four, five, six, or more cycle lengths between a minimum cycle length and a maximum cycle length, inclusive. In some aspects, a change in cycle lengths in consecutive cycles may be incremental (e.g., the cycle length may be increased or decreased by a fixed amount).

Thus, as shown in FIGS. 6A and 6B, in some aspects, the UE 605 may wake up periodically for a plurality of on durations of the eDRX cycle 625 and may iteratively and/or periodically determine whether the UE 605 is in the condition, associated with triggering the TAU, during the plurality of on durations. In some aspects, the UE 605 may determine whether the UE 605 is in the condition in consecutive on durations, thereby updating the condition of the UE 605 more often, resulting in a more accurate reflection of the current condition of the UE 605. Additionally, or alternatively, the UE 605 may skip one or more on durations when determining whether the UE 605 is in the condition (e.g., may not make the determination during every on duration), thereby conserving UE resources (e.g., memory, processing resources, and/or the like).

In some aspects, the UE 605 may iteratively and/or periodically reconfigure (e.g., increase or decrease) the cycle length of the eDRX cycle 625 based at least in part on determining whether the UE 605 is in the condition during the plurality of on durations. For example, after each determination of the condition of the UE 605 during an on duration, the UE 605 may determine whether to increase, decrease, or maintain the cycle length for a subsequent (or future) cycle. In some aspects, each iterative increase or decrease may be an incremental increase or decrease (e.g., by a fixed time period). For example, the cycle length of the eDRX cycle may be iteratively increased until the cycle length satisfies a maximum threshold. Additionally, or alternatively, the cycle length of the eDRX cycle may be iteratively decreased until the cycle length satisfies a minimum threshold. In some aspects, the minimum threshold and/or the maximum threshold may be indicated in a signaling message from a base station 615-A, 615-B.

In some aspects, the UE 605 may signal the increased or decreased cycle length to a base station (e.g., the first base station 615-A and/or the second base station 615-B) to assist with effective communication between the UE 605 and the base station. Additionally, or alternatively, the UE 605 may request an increase or decrease to the cycle length by transmitting a request to the base station. The base station may approve or deny the request, and may indicate such approval or denial to the UE 605, which may adjust or maintain the cycle length accordingly. Additionally, or alternatively, the base station may determine a length for the cycle time (e.g., an increased cycle time, a decreased cycle time, an amount by which to increase or decrease the current cycle time, and/or the like), and may indicate the length to the UE 605, which may configure the cycle time based at least in part on the indicated length. In some aspects, the UE 605 may indicate the condition (e.g., one or more thresholds that were satisfied) to the base station, and the base station may determine a length for the cycle time based at least in part on the indication of the condition.

In some aspects, an amount of the increase or decrease in the cycle length may be based at least in part on one or more thresholds associated with the condition. For example, the UE 605 may increase or decrease the cycle length by an amount determined based at least in part on which threshold(s), of multiple thresholds, are satisfied. In this way, the cycle length may be adjusted to a length that is inversely proportional to a likelihood of triggering a TAU (e.g., a shorter cycle length for a higher likelihood of triggering a TAU and a longer cycle length for a lower likelihood of triggering a TAU). In some aspects, the UE 605 may set the cycle length to a minimum cycle length for the eDRX cycle 625 based at least in part on determining that the UE has a high likelihood of triggering the tracking area update (e.g., based at least in part on one or more conditions satisfying one or more particular thresholds).

In some aspects, the UE 605 may adjust (e.g., may increase or decrease) the cycle length based at least in part on a TAU period associated with the UE 605, a paging interval associated with the UE 605, and/or the like. For example, the UE 605 may receive information indicating the TAU period and/or the paging interval, and may adjust the cycle length such that an on duration of the eDRX cycle 625 aligns with the TAU period and/or the paging interval. In this way, the UE 605 may be more likely to trigger a TAU procedure and/or receive a page during an on duration of the eDRX cycle 625.

Although FIGS. 6A and 6B show the UE 605 decreasing the cycle length at a first time and later increasing the cycle length at a second time, in some aspects, the UE 605 may increase the cycle length at a first time and may later decrease the cycle length at a second time. Additionally, or alternatively, the UE 605 may iteratively and incrementally increase the cycle time over multiple eDRX cycles 625. Additionally, or alternatively, the UE 605 may iteratively and incrementally decrease the cycle time over multiple eDRX cycles 625. Additionally, or alternatively, the UE 605 may maintain the cycle length (e.g., keep the cycle length the same) over multiple consecutive eDRX cycle 625.

As indicated above, FIGS. 6A and 6B are provided merely as examples. Other examples are possible and may differ from what was described with regard to FIGS. 6A and 6B.

FIG. 7 is a diagram illustrating an example process 700 performed, for example, by a UE, in accordance with various aspects of the present disclosure. Example process 700 is an example where a UE (e.g., UE 120, 505, 605, and/or the like) configures an extended discontinuous reception cycle to account for tracking area update conditions.

As shown in FIG. 7, in some aspects, process 700 may include configuring a cycle length of an extended discontinuous reception (eDRX) cycle (block 710). For example, the UE may configure a cycle length of an eDRX cycle, as described in more detail in connection with FIGS. 5, 6A, and 6B.

As further shown in FIG. 7, in some aspects, process 700 may include determining whether a UE is in a condition, associated with triggering a tracking area update, during an on duration of the eDRX cycle (block 720). For example, the UE may determine whether the UE is in a condition, associated with triggering a TAU, during an on duration of the eDRX cycle, as described in more detail in connection with FIGS. 5, 6A, and 6B.

As further shown in FIG. 7, in some aspects, process 700 may include selectively increasing or decreasing the cycle length of the eDRX cycle based at least in part on determining whether the UE is in the condition, wherein the cycle length is decreased when the UE is in the condition or is increased when the UE is not in the condition (block 730). For example, the UE may selectively increase or decrease the cycle length of the eDRX cycle based at least in part on determining whether the UE is in the condition, as described in more detail in connection with FIGS. 5, 6A, and 6B. In some aspects, the cycle length is decreased when the UE is in the condition or is increased when the UE is not in the condition, as described above.

In some aspects, the cycle length is decreased for the UE to perform a tracking area update procedure when the UE is in the condition. In some aspects, the cycle length is increased or decreased based at least in part on a tracking area update period or a paging interval of the UE.

In some aspects, the UE may wake up periodically for a plurality of on durations of the eDRX cycle, may iteratively determine whether the UE is in the condition during the plurality of on durations, and may iteratively increase, decrease, or maintain the cycle length of the eDRX cycle based at least in part on determining whether the UE is in the condition during the plurality of on durations.

In some aspects, the cycle length of the eDRX cycle is iteratively increased until the cycle length satisfies a maximum threshold. In some aspects, the cycle length of the eDRX cycle is iteratively decreased until the cycle length satisfies a minimum threshold. In some aspects, the UE is initially configured with a minimum cycle length for the eDRX cycle. In some aspects, the minimum cycle length is based at least in part on a tracking area update period. In some aspects, the UE is configured to set the cycle length to a minimum cycle length for the eDRX cycle based at least in part on determining that the UE has a high likelihood of triggering the tracking area update. In some aspects, the increased or decreased cycle length is signaled to a base station.

In some aspects, the increasing or decreasing the cycle length is performed based at least in part on whether a change in energy detected by the UE in a time period satisfies a threshold. In some aspects, the increasing or decreasing the cycle length is performed based at least in part on whether a number of tracking area changes for the UE in a time period satisfies a threshold. In some aspects, the increasing or decreasing the cycle length is performed based at least in part on whether a received energy of a serving cell of the UE satisfies a threshold. In some aspects, the increasing or decreasing the cycle length is performed based at least in part on location information associated with the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
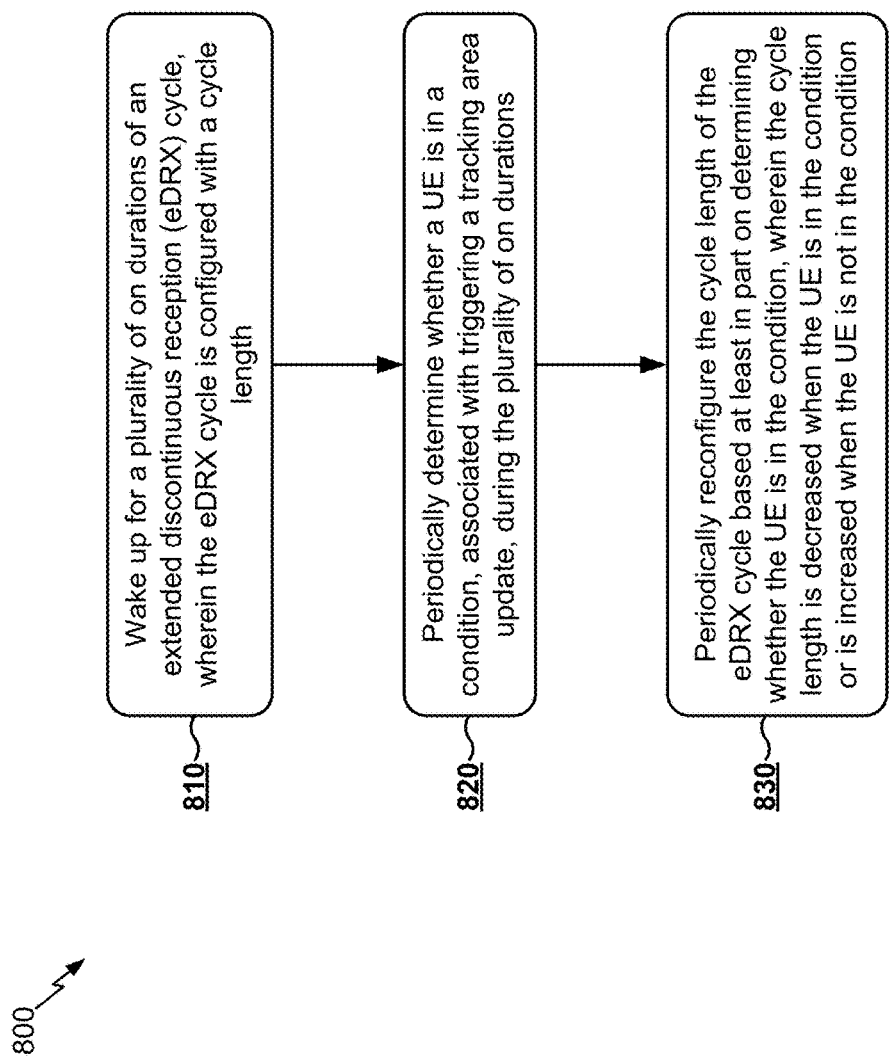

FIG. 8 is a diagram illustrating an example process 800 performed, for example, by a UE, in accordance with various aspects of the present disclosure. Example process 800 is an example where a UE (e.g., UE 120, 505, 605, and/or the like) configures an extended discontinuous reception cycle to account for tracking area update conditions.

As shown in FIG. 8, in some aspects, process 800 may include waking up for a plurality of on durations of an extended discontinuous reception (eDRX) cycle, wherein the eDRX cycle is configured with a cycle length (block 810). For example, the UE may wake up for a plurality of on durations of an eDRX cycle, as described in more detail in connection with FIGS. 5, 6A, and 6B. In some aspects, the eDRX cycle is configured with a cycle length, as described above.

As further shown in FIG. 8, in some aspects, process 800 may include periodically determining whether a UE is in a condition, associated with triggering a tracking area update, during the plurality of on durations (block 820). For example, the UE may periodically determine whether the UE is in a condition, associated with triggering a TAU, during the plurality of on durations, as described in more detail in connection with FIGS. 5, 6A, and 6B.

As further shown in FIG. 8, in some aspects, process 800 may include periodically reconfiguring the cycle length of the eDRX cycle based at least in part on determining whether the UE is in the condition, wherein the cycle length is decreased when the UE is in the condition or is increased when the UE is not in the condition (block 830). For example, the UE may periodically reconfigure the cycle length of the eDRX cycle based at least in part on determining whether the UE is in the condition, as described in more detail in connection with FIGS. 5, 6A, and 6B. In some aspects, the cycle length is decreased when the UE is in the condition or is increased when the UE is not in the condition, as described above.

In some aspects, the cycle length is decreased for the UE to perform a tracking area update procedure when the UE is in the condition. In some aspects, the cycle length is increased or decreased based at least in part on a tracking area update period or a paging interval of the UE.

In some aspects, the UE may wake up periodically for a plurality of on durations of the eDRX cycle, may iteratively determine whether the UE is in the condition during the plurality of on durations, and may iteratively increase, decrease, or maintain the cycle length of the eDRX cycle based at least in part on determining whether the UE is in the condition during the plurality of on durations.

In some aspects, the cycle length of the eDRX cycle is iteratively increased until the cycle length satisfies a maximum threshold. In some aspects, the cycle length of the eDRX cycle is iteratively decreased until the cycle length satisfies a minimum threshold. In some aspects, the UE is initially configured with a minimum cycle length for the eDRX cycle. In some aspects, the minimum cycle length is based at least in part on a tracking area update period. In some aspects, the UE is configured to set the cycle length to a minimum cycle length for the eDRX cycle based at least in part on determining that the UE has a high likelihood of triggering the tracking area update. In some aspects, the increased or decreased cycle length is signaled to a base station.

In some aspects, the increasing or decreasing the cycle length is performed based at least in part on whether a change in energy detected by the UE in a time period satisfies a threshold. In some aspects, the increasing or decreasing the cycle length is performed based at least in part on whether a number of tracking area changes for the UE in a time period satisfies a threshold. In some aspects, the increasing or decreasing the cycle length is performed based at least in part on whether a received energy of a serving cell of the UE satisfies a threshold. In some aspects, the increasing or decreasing the cycle length is performed based at least in part on location information associated with the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   configuring a cycle length of an extended discontinuous reception (eDRX) cycle;
   determining whether the UE is in a condition, associated with triggering a tracking area update, during an on duration of the eDRX cycle,
      wherein the condition includes at least one of a mobility condition or a cell edge condition; and
   selectively increasing or decreasing the cycle length of the eDRX cycle based at least in part on determining whether the UE is in the condition, wherein the cycle length is decreased when the UE is in the condition or is increased when the UE is not in the condition,
      wherein when the cycle length is decreased when the UE is in the condition, the cycle length is decreased based on a tracking area update period.

2. The method of claim 1, wherein the UE performs a tracking area update procedure when the UE is in the condition.

3. The method of claim 1, further comprising:
   waking up periodically for a plurality of on durations of the eDRX cycle;
   iteratively determining whether the UE is in the condition during the plurality of on durations; and
   iteratively increasing, decreasing, or maintaining the cycle length of the eDRX cycle based at least in part on determining whether the UE is in the condition during the plurality of on durations.

4. The method of claim 1, wherein the cycle length of the eDRX cycle is iteratively increased until the cycle length satisfies a maximum threshold.

5. The method of claim 1, wherein the cycle length of the eDRX cycle is iteratively decreased until the cycle length satisfies a minimum threshold.

6. The method of claim 1, wherein the UE is initially configured with a minimum cycle length for the eDRX cycle.

7. The method of claim 6, wherein the minimum cycle length is based at least in part on the tracking area update period.

8. The method of claim 1, wherein the UE is configured to set the cycle length to a minimum cycle length for the eDRX cycle based at least in part on determining that the UE has a high likelihood of triggering the tracking area update.

9. The method of claim 1, wherein the increased or decreased cycle length is signaled to a base station.

10. The method of claim 1, wherein the increasing or decreasing the cycle length is performed based at least in part on whether a change in energy detected by the UE in a time period satisfies a threshold.

11. The method of claim 1, wherein the increasing or decreasing the cycle length is performed based at least in part on whether a number of tracking area changes for the UE in a time period satisfies a threshold.

12. The method of claim 1, wherein the increasing or decreasing the cycle length is performed based at least in part on whether a received energy of a serving cell of the UE satisfies a threshold.

13. The method of claim 1, wherein the increasing or decreasing the cycle length is performed based at least in part on location information associated with the UE.

14. A method of wireless communication performed by a user equipment (UE), comprising:
   waking up for a plurality of on durations of an extended discontinuous reception (eDRX) cycle, wherein the eDRX cycle is configured with a cycle length;
   periodically determining whether the UE is in a condition, associated with triggering a tracking area update, during the plurality of on durations,
      wherein the condition includes at least one of a mobility condition or a cell edge condition; and
   periodically reconfiguring the cycle length of the eDRX cycle based at least in part on determining whether the UE is in the condition, wherein the cycle length is decreased when the UE is in the condition or is increased when the UE is not in the condition,
      wherein when the cycle length is decreased when the UE is in the condition, the cycle length is decreased based on a tracking area update period.

15. A user equipment (UE) for wireless communication, comprising:
   a memory; and
   one or more processors operatively coupled to the memory, the one or more processors configured to:
      configure a cycle length of an extended discontinuous reception (eDRX) cycle;
      determine whether the UE is in a condition, associated with triggering a tracking area update, during an on duration of the eDRX cycle,
         wherein the condition includes at least one of a mobility condition or a cell edge condition; and
      selectively increase or decrease the cycle length of the eDRX cycle based at least in part on determining whether the UE is in the condition, wherein the cycle length is decreased when the UE is in the condition or is increased when the UE is not in the condition, wherein when the cycle length is decreased when the UE is in the condition, the cycle length is decreased based on a tracking area update period.

16. The UE of claim 15, wherein the UE performs a tracking area update procedure when the UE is in the condition.

17. The UE of claim 15, wherein the one or more processors are further configured to:
wake up periodically for a plurality of on durations of the eDRX cycle;
iteratively determine whether the UE is in the condition during the plurality of on durations; and
iteratively increase, decrease, or maintain the cycle length of the eDRX cycle based at least in part on determining whether the UE is in the condition during the plurality of on durations.

18. The UE of claim 15, wherein the cycle length of the eDRX cycle is iteratively increased until the cycle length satisfies a maximum threshold.

19. The UE of claim 15, wherein the cycle length of the eDRX cycle is iteratively decreased until the cycle length satisfies a minimum threshold.

20. The UE of claim 15, wherein the UE is initially configured with a minimum cycle length for the eDRX cycle.

21. The UE of claim 20, wherein the minimum cycle length is based at least in part on the tracking area update period.

22. The UE of claim 15, wherein the UE is configured to set the cycle length to a minimum cycle length for the eDRX cycle based at least in part on determining that the UE has a high likelihood of triggering the tracking area update.

23. The UE of claim 15, wherein the increased or decreased cycle length is signaled to a base station.

24. The UE of claim 15, wherein the one or more processors are configured to increase or decrease the cycle length based at least in part on whether a change in energy detected by the UE in a time period satisfies a threshold.

25. The UE of claim 15, wherein the one or more processors are configured to increase or decrease the cycle length based at least in part on whether a number of tracking area changes for the UE in a time period satisfies a threshold.

26. The UE of claim 15, wherein the one or more processors are configured to increase or decrease the cycle length based at least in part on whether a received energy of a serving cell of the UE satisfies a threshold.

27. The UE of claim 15, wherein the one or more processors are configured to increase or decrease the cycle length based at least in part on location information associated with the UE.

28. A user equipment (UE) for wireless communication, comprising:
a memory; and
one or more processors operatively coupled to the memory, the one or more processors configured to:
wake up for a plurality of on durations of an extended discontinuous reception (eDRX) cycle, wherein the eDRX cycle is configured with a cycle length;
periodically determine whether the UE is in a condition, associated with triggering a tracking area update, during the plurality of on durations,
wherein the condition includes at least one of a mobility condition or a cell edge condition; and
periodically reconfigure the cycle length of the eDRX cycle based at least in part on determining whether the UE is in the condition, wherein the cycle length is decreased when the UE is in the condition or is increased when the UE is not in the condition,
wherein when the cycle length is decreased when the UE is in the condition, the cycle length is decreased based on a tracking area update period.

29. A non-transitory computer-readable medium storing one or more instructions for wireless communication, comprising:
one or more instructions that, when executed by one or more processors, cause the one or more processors to:
configure a cycle length of an extended discontinuous reception (eDRX) cycle;
determine whether a user equipment (UE) is in a condition, associated with triggering a tracking area update, during an on duration of the eDRX cycle,
wherein the condition includes at least one of a mobility condition or a cell edge condition; and
selectively increase or decrease the cycle length of the eDRX cycle based at least in part on determining whether the UE is in the condition, wherein the cycle length is decreased when the UE is in the condition or is increased when the UE is not in the condition,
wherein when the cycle length is decreased when the UE is in the condition, the cycle length is decreased based on a tracking area update period.

30. A non-transitory computer-readable medium storing one or more instructions for wireless communication, comprising:
one or more instructions that, when executed by one or more processors, cause the one or more processors to:
wake up for a plurality of on durations of an extended discontinuous reception (eDRX) cycle, wherein the eDRX cycle is configured with a cycle length;
periodically determine whether a user equipment (UE) is in a condition, associated with triggering a tracking area update, during the plurality of on durations,
wherein the condition includes at least one of a mobility condition or a cell edge condition; and
periodically reconfigure the cycle length of the eDRX cycle based at least in part on determining whether the UE is in the condition, wherein the cycle length is decreased when the UE is in the condition or is increased when the UE is not in the condition,
wherein when the cycle length is decreased when the UE is in the condition, the cycle length is decreased based on a tracking area update period.

31. The method of claim 1, wherein when the cycle length is decreased when the UE is in the condition, the cycle length is adjusted to align an on duration of the eDRX cycle with the tracking area update period.

32. The UE of claim 15, wherein when the cycle length is decreased when the UE is in the condition, the cycle length is adjusted to align an on duration of the eDRX cycle with the tracking area update period.

* * * * *